(12) United States Patent
Saito

(10) Patent No.: US 10,079,107 B2
(45) Date of Patent: Sep. 18, 2018

(54) METALLIZED FILM CAPACITOR, MANUFACTURING METHOD OF METALLIZED FILM CAPACITOR, AND METALLIZED FILM LAMINATE

(71) Applicant: TOYOTA JIDOSHA KABUSHIKI KAISHA, Toyota-shi, Aichi-ken (JP)

(72) Inventor: Takahiro Saito, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/478,288

(22) Filed: Apr. 4, 2017

(65) Prior Publication Data

US 2017/0294269 A1    Oct. 12, 2017

(30) Foreign Application Priority Data

Apr. 8, 2016   (JP) .................. 2016-078183

(51) Int. Cl.
| | |
|---|---|
| *H01G 4/30* | (2006.01) |
| *H01G 4/015* | (2006.01) |
| *H01G 4/005* | (2006.01) |
| *B32B 3/28* | (2006.01) |
| *B32B 15/01* | (2006.01) |
| *H01G 4/18* | (2006.01) |
| *H01G 4/228* | (2006.01) |
| *B32B 37/18* | (2006.01) |

(Continued)

(52) U.S. Cl.
CPC ............... *H01G 4/306* (2013.01); *B32B 3/28* (2013.01); *B32B 15/01* (2013.01); *H01G 4/18* (2013.01); *H01G 4/228* (2013.01); *B32B 37/18* (2013.01); *B32B 38/06* (2013.01); *B32B 2037/246* (2013.01); *B32B 2255/06* (2013.01); *B32B 2255/205* (2013.01); *B32B 2457/16* (2013.01)

(58) Field of Classification Search
CPC .......... H01G 4/306; H01G 4/18; H01G 4/228; H01G 4/015; H01G 4/005; B32B 3/28; B32B 15/01; B32B 37/18; B32B 38/06; B32B 2037/246; B32B 2255/06; B32B 2255/205; B32B 2457/16
USPC .................................. 361/273, 303
See application file for complete search history.

(56) References Cited

U.S. PATENT DOCUMENTS

2008/0278888 A1\* 11/2008 Yang ................... H01G 2/16
361/323

FOREIGN PATENT DOCUMENTS

| JP | 2004-200588 A | 7/2004 |
| JP | 2015-185660 A | 10/2015 |

\* cited by examiner

*Primary Examiner* — Michael P McFadden
(74) *Attorney, Agent, or Firm* — Sughrue Mion, PLLC

(57) ABSTRACT

A metallized film capacitor includes: a metallized film columnar body including two metallized films that are laminated and wound, the two metalized films each including a vapor-deposited metal film with a plurality of vapor-deposition-free slits and fuse portions each interposed between the vapor-deposition-free slits, and a polyvinylidene fluoride dielectric film, the metallized film columnar body having two electrode extraction surfaces; metal-sprayed parts disposed respectively on the two electrode extraction surfaces; and outgoing terminals joined respectively to the metal-sprayed parts. Each of the two metallized films has a shape with successive sloped ridges and valleys in a cross-section orthogonal to a winding direction, and the two metallized films are laminated such that the ridges and (Continued)

valleys of one of the metallized films are aligned with the ridges and valleys of the other one of the metallized films.

6 Claims, 9 Drawing Sheets

(51) Int. Cl.
*B32B 38/06* (2006.01)
*B32B 37/24* (2006.01)

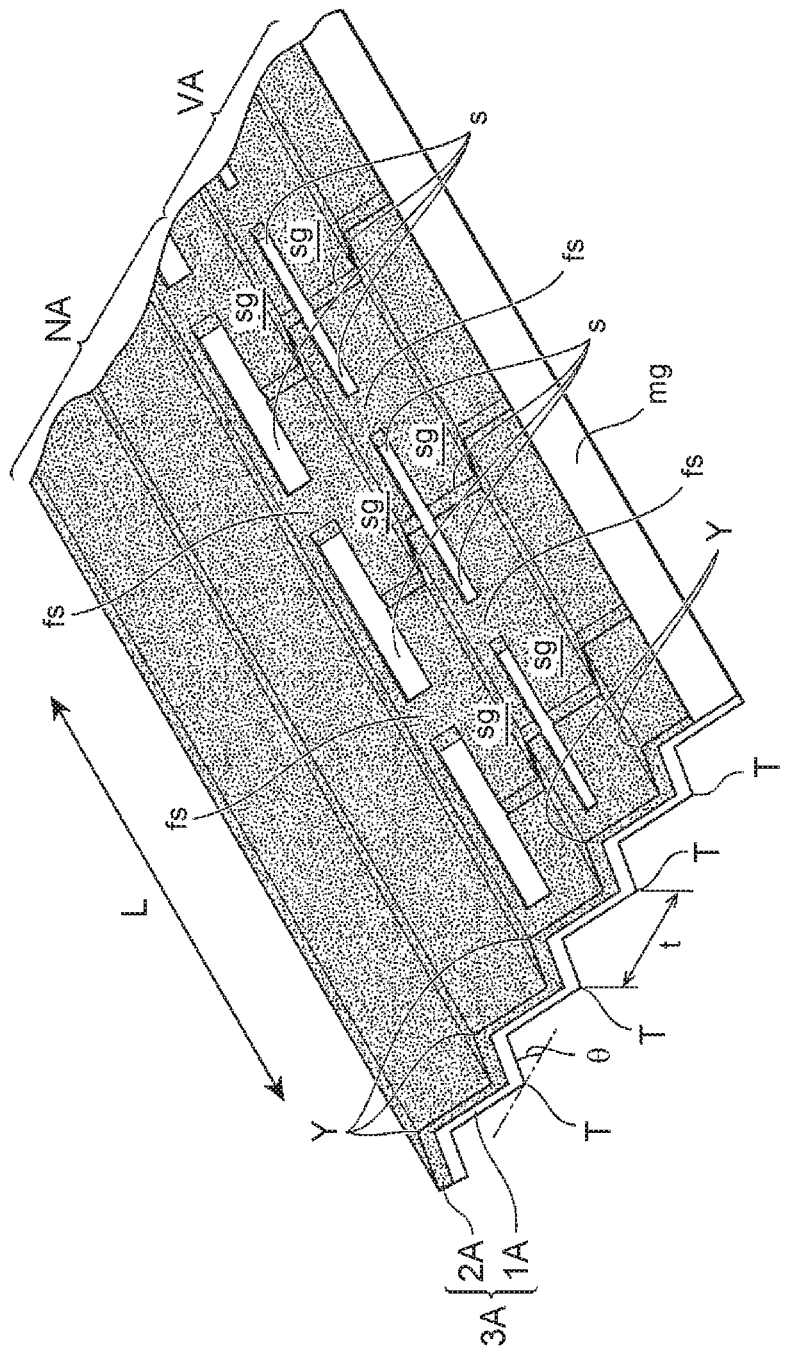

US 10,079,107 B2

METALLIZED FILM CAPACITOR, MANUFACTURING METHOD OF METALLIZED FILM CAPACITOR, AND METALLIZED FILM LAMINATE

INCORPORATION BY REFERENCE

The disclosure of Japanese Patent Application No. 2016-078183 filed on Apr. 8, 2016 including the specification, drawings and abstract is incorporated herein by reference in its entirety.

BACKGROUND

1. Technical Field

The present disclosure relates to a metallized film capacitor, a metallized film capacitor manufacturing method, and a metallized film laminate used for this metallized film capacitor.

2. Description of Related Art

Metallized film capacitors that can withstand high voltage and have excellent temperature characteristics and excellent frequency characteristics are used, for example, in inverter circuits for vehicles. Commonly used metallized film capacitors are of a wound type formed by winding metallized films. Moreover, metallized film capacitors having a self-healing function of remedying a state of dielectric breakdown in the capacitor have also been developed. The configuration of such a capacitor will be described with reference to FIGS. 7 and 8.

FIG. 7 shows two types of metallized films c1, c2. One metallized film c1 is composed of a dielectric film a1, and a vapor-deposited metal film b1 with vapor-deposition-free slits s and an insulation margin mg. Similarly, the other metallized film c2 is composed of a dielectric film a2, and a vapor-deposited metal film b2 with vapor-deposition-free slits s and an insulation margin mg. The metallized films c1, c2 have the insulation margins mg on opposite sides from each other.

In the vapor-deposited metal films b1, b2 of the metallized films c1, c2, the plurality of vapor-deposition-free slits s are formed at intervals, with narrow fuse portions fs formed between ends of the vapor-deposition-free slits s, so that the vapor-deposited metal films b1, b2 are divided into a plurality of segments sg surrounded by the vapor-deposition-free slits s.

The metallized films c1, c2 are laminated so that the insulation margins mg do not coincide with each other in a lamination direction, to form a pair of metallized films d, and the pair of metallized films d are wound as shown in FIG. 8 to form a metallized film columnar body K. Then, metal-sprayed parts e (metal-sprayed electrodes) are formed respectively on two electrode extraction surfaces at both ends of the metallized film columnar body K, and outgoing terminals f (bus bars) are connected respectively to the metal-sprayed parts e through a solder layer g, and thus a metallized film capacitor C is formed.

Japanese Patent Application Publication No. 2004-200588 discloses a metallized film capacitor that is formed by laminating two metallized films. As shown in FIG. 7, one of laminating two metallized films is composed of a dielectric film and a vapor-deposited metal film with vapor-deposition-free slits and an insulation margin, and the other is composed of a dielectric film and a vapor-deposited metal film with only an insulation margin, to constitute a pair of metallized films, and then laminating or winding this pair of metallized films.

As shown in FIG. 8, in the metallized films c1, c2, ends of the vapor-deposited metal films b1, b2 on a side opposite from the insulation margins mg are in contact with the metal-sprayed parts e. On the other hand, ends with the insulation margins mg are blocked by the insulation margins mg from coming in contact with the metal-sprayed parts e. To ensure contact with the electrodes, the ends of the vapor-deposited metal films b1, b2 that are in close contact with the metal-sprayed parts e are so-called heavy edges having a larger thickness than other portions of the films. For example, when the thickness of a general part of the vapor-deposited metal film is approximately several tens of nanometers, the thickness of the heavy edge is adjusted to be approximately twice as large. A metallized film capacitor C that is housed in a case (not shown) and sealed with a molded resin body (not shown) formed inside the case is also commonly used.

Although the vapor-deposited metal films b1, b2 of the metallized films c1, c2 are divided into the plurality of segments sg surrounded by the plurality of vapor-deposition-free slits s, the fuse portions fs (that are vapor-deposited portions) present between the vapor-deposition-free slits s allow the adjacent segments sg to electrically conduct to each other through the fuse portions fs.

If one segment sg falls into a state of dielectric breakdown, the fuse portion fs functions to interrupt conduction between that segment sg and the adjacent segments sg. Dielectric breakdown occurs due to absence of a dielectric etc. in one segment sg, and if dielectric breakdown occurs, the affected segment sg conducts to another segment sg in a lower layer. Thus, if dielectric breakdown occurs, a larger amount of current flows into the segment sg in a state of dielectric breakdown through the fuse portion fs.

As the amount of current flowing through the fuse portion fs increases, the temperature of the fuse portion fs rises, causing the vapor-deposited metal film on the fuse portion fs to evaporate and diffuse. As a result, the segment sg in a state of dielectric breakdown is isolated from the adjacent segments sg. Thus, the self-healing function is a function of remedying a state of dielectric breakdown in a film capacitor by isolating one segment sg in a state of dielectric breakdown from the adjacent segments sg.

SUMMARY

Allowing a gas between metallized films to escape easily is important in ensuring the self-healing function. Here, the "gas" between metallized films refers to a high-temperature gas that is generated as the dielectric film and the vapor-deposited metal film in a dielectric breakdown area evaporate. If the gas is generated while upper and lower films are in close contact with each other with high strength, the gas is unable to fully escape and is retained. The retained gas locally reaches a higher temperature while melting the films, which can lead to a short-circuit.

Here, a situation where a gas generated during dielectric breakdown is unable to fully escape and is retained will be described with reference to FIG. 9. As shown in FIG. 9, a gas Ga generated when a fuse portion is blown in a dielectric breakdown area ZH is blocked from escaping sideward by close contact portions M of the dielectric film and the vapor-deposited metal film on both sides of the dielectric breakdown area ZH, and is thus retained in the vicinity of the dielectric breakdown area ZH. While being retained, this gas may locally reach a higher temperature and successively melt a plurality of laminated films (so-called multi-layer melting).

In the technical field of the present disclosure, downsizing of metallized film capacitors is an important challenge to be addressed, and increasing the permittivity of the metallized films is an effective way of achieving downsizing of the metallized film capacitors. One such measure for downsizing a metallized film capacitor is to use a dielectric film composed of a polyvinylidene fluoride (PVDF) material, for example, containing a high-permittivity filler.

However, as a polyvinylidene fluoride (PVDF) dielectric film has a low coefficient of friction, it is likely that the gas generated during dielectric breakdown is unable to fully escape. This gas may cause the polyvinylidene fluoride dielectric film to expand and be retained in a space formed by the expansion. Thus, the self-healing function may fail to be sufficiently fulfilled.

Moreover, a polyvinylidene fluoride (PVDF) dielectric film has a low coefficient of friction and is slippery, which makes it difficult to form a metallized film capacitor.

More specifically, when one tries to form a metallized film columnar body by winding a metallized film, the dielectric film with a low coefficient of friction is likely to slip in a width direction of the dielectric film (direction orthogonal to a winding direction), making it difficult to wind the metallized film.

The present disclosure provides a metallized film capacitor having an enhanced self-healing function, a manufacturing method of a metallized film capacitor, and a metallized film laminate having excellent windability.

According to one aspect of the disclosure, a metallized film capacitor includes: a metallized film columnar body including two metallized films that are laminated and wound, the two metalized films each including a vapor-deposited metal film with a plurality of vapor-deposition-free slits and fuse portions each interposed between the vapor-deposition-free slits, and a polyvinylidene fluoride dielectric film, the metallized film columnar body having two electrode extraction surfaces; metal-sprayed parts disposed respectively on the two electrode extraction surfaces; and outgoing terminals joined respectively to the metal-sprayed parts. Each of the two metallized films has a shape with successive sloped ridges and valleys in a cross-section orthogonal to a winding direction, and the two metallized films are laminated such that the ridges and valleys of one of the metallized films are aligned with the ridges and valleys of the other one of the metallized films.

In the metallized film capacitor of the present disclosure, the metallized film has a shape with successive sloped ridges and valleys in a cross-section orthogonal to the winding direction (longitudinal direction). The metallized films are laminated with the pluralities of ridges and valleys of one metallized film aligned with those of the other metallized film. Thus shaped, the metallized film of the present disclosure includes the polyvinylidene fluoride (PVDF) dielectric film as a component and yet is less likely to expand when a gas pressure of a gas generated during dielectric breakdown acts on the metallized film. Moreover, the metallized film of the present disclosure has an enhanced self-healing function, as retention of the gas inside the metallized films is prevented.

The metallized film of the present disclosure is configured so that the dielectric film is prevented from slipping in the width direction during winding of the metallized film by the cross-section composed of the ridges and the valleys.

Having a cross-sectional shape with the successive ridges and valleys, the metallized films when laminated are less likely to be misaligned with each other in the width direction. When a slope angle of the ridge from a horizontal line is $\theta$, a force trying to slip (misalign) the metallized films in the width direction is $\cos \theta$ times the original force in a horizontal direction. Thus, the force trying to slip the metallized films in the width direction is reduced. As a result, the cross-sectional shape of the metallized films described above makes the metallized films less likely to slip.

As the metallized films are thus less likely to slip, the metallized films offer high windability. As a footnote, the metallized film capacitor being of a wound type, the plurality of metallized films are less likely to be misaligned in the winding direction (longitudinal direction), and therefore high windability is ensured if the metallized films are made less likely to be misaligned in the width direction (short-side direction).

Here, the dielectric film is not limited to being made only of polyvinylidene fluoride (PVDF), but may instead be made of a polyvinylidene fluoride (PVDF) material containing a filler such as ferroelectric barium titanate (BTO: BaTiO).

According to one aspect of the disclosure, each of the ridges may have such a shape that a resistance of twice a coefficient of friction of the dielectric film acts on the dielectric film.

According to one aspect of the disclosure, each of the ridges may have such a shape that a resistance equivalent to a coefficient of static friction of 0.8 or higher acts on the dielectric film.

According to the present disclosure, to provide the metallized film with high windability and the metallized film capacitor with high self-healing properties, it is preferable that a coefficient of static friction of the metallized film be 0.8 or higher.

The coefficient of static friction of a polyvinylidene fluoride (PVDF) dielectric film is approximately 0.4. Accordingly, if a resistance to the dielectric film (non-slipperiness of the dielectric film) is doubled, the non-slipperiness is substantially equivalent to a coefficient of static friction of 0.8. That is, a combination of the coefficient of static friction of the metallized film and a resistance due to restraint by the ridge acting on the metallized film is a resistance equal to or higher than a coefficient of static friction of 0.8.

According to the above mentioned aspect, a slope angle $\theta$ of each of the ridges from a horizontal line may be 60 degrees or larger.

If the slope angle $\theta$ of the ridge from the horizontal line is 60 degrees, a force with which the metallized film tries to move sideward out of alignment is expressed as $\cos 60° = \frac{1}{2}$. Thus, the force trying to slip the metallized film is halved, which is substantially the same as the coefficient of static friction of the dielectric film of 0.4 being doubled. On the basis of this estimation result, the slope angle $\theta$ of the ridge from the horizontal line is specified to be 60 degrees or higher.

After two metallized films are laminated, it is practically difficult to shape these metallized films so as to have successive ridges and valleys in a cross-section. For this reason, the two metallized films are laminated after being shaped so as to have successive ridges and valleys in a cross-section. It has been found that the accuracy of positioning the metallized films with each other is approximately 0.5 mm in this case, and therefore the width of the ridge is desirably set to be equal to or larger than 0.5 mm which is the positioning accuracy.

According to the above mentioned aspect, a metallized film capacitor manufacturing method includes: forming, on a surface of a polyvinylidene fluoride dielectric film, a vapor-deposited metal film with a plurality of vapor-deposition-free slits and fuse portions each interposed between the vapor-deposition-free slits to produce a metallized film intermediate body, and then shaping the metallized film intermediate body so as to have successive sloped ridges and valleys in a cross-section orthogonal to a winding direction of the metallized film intermediate body to produce a metallized film; laminating two of the metallized film with the ridges and valleys of one of the metallized films aligned with the ridges and valleys of the other one of the metallized films, and winding the laminate to produce a metallized film columnar body; and forming metal-sprayed parts respectively on two electrode extraction surfaces of the metallized film columnar body and joining outgoing terminals respectively to the metal-sprayed parts, thus manufacturing a metallized film capacitor.

After the metallized film intermediate body is produced by forming the vapor-deposited metal film on the surface of the dielectric film, the metallized film having a cross-sectional shape with successive sloped ridges and valleys can be produced, for example, by passing the metallized film intermediate body between upper and lower rotating rolls having zigzag recesses and projections.

The two metallized films having a cross-sectional shape with successive ridges and valleys are laminated with the ridges and the valleys of one metallized film aligned with those of the other metallized film, and then this laminate is wound to produce the metallized film columnar body.

In this winding process, as already described, the laminated metallized films are less likely to be misaligned from each other, as well as the force trying to slip the metallized films in the width direction is reduced. Thus, high windability is achieved, allowing for an efficient, high-accuracy winding process.

Aluminum, zinc, or the like is sprayed on the electrode extraction surfaces of the metallized film columnar body to form the metal-sprayed parts.

Then, the outgoing terminals, such as rod- or plate-like bus bars, are connected to surfaces of the formed metal-sprayed parts through a solder layer, and thus a metallized film capacitor is manufactured.

According to the other aspect of the disclosure, a metallized film laminate for a wound metallized film capacitor includes two metallized films each including a vapor-deposited metal film with a plurality of vapor-deposition-free slits and fuse portions each interposed between the vapor-deposition-free slits, and a polyvinylidene fluoride dielectric film. The two metallized films are laminated and wound to constitute the metallized film laminate. Each of the two metallized films has a shape with successive sloped ridges and valleys in a cross-section orthogonal to a winding direction. The two metallized films are laminated such that the ridges and valleys of one of the metallized films are aligned with the ridges and valleys of the other one of the metallized films.

According to the metallized film laminate of the present disclosure, the metallized films composing the laminate each have a cross-sectional shape with successive ridges and valleys. Thus, this metallized film laminate offers high windability in that the metallized films are less likely to be misaligned during winding of the metallized film laminate. In view of inhibiting cracks from occurring at the fuse portions during the manufacturing process, it is preferable that the fuse portions be located not at peaks of the ridges and the valleys but on the slopes in the metallized film laminate. Moreover, in view of heat dissipation, it is preferable that one row of the fuse portions be disposed in one surface.

As can be understood from the above description, according to the metallized film capacitor, the manufacturing method thereof, and the metallized film laminate of the present disclosure, the metallized film has a shape with the successive sloped ridges and valleys in a cross-section orthogonal to the winding direction, and the metallized films are laminated with the pluralities of ridges and valleys of one metallized film aligned with those of the other metallized film. Thus, this metallized film capacitor has the polyvinylidene fluoride (PVDF) dielectric film as a component, and yet high windability during winding of the metallized films is ensured and the self-healing function of the metallized film capacitor is enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a schematic view showing the metallized film produced;

DETAILED DESCRIPTION OF EMBODIMENTS

An embodiment of a metallized film, a metallized film capacitor, and a manufacturing method thereof of the present disclosure will be described below with reference to the drawings.

Figure 1:
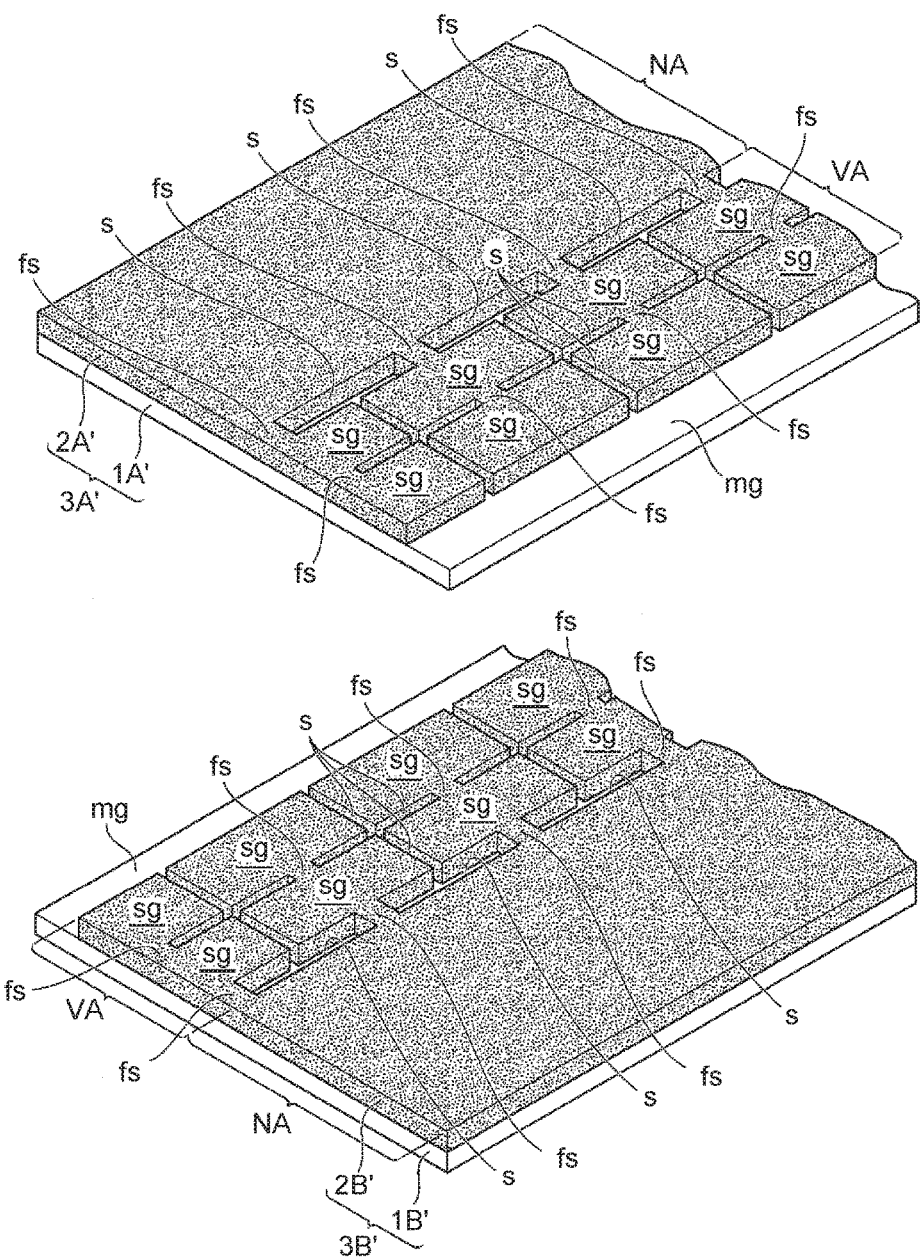
FIG. 1 is a schematic view of a first step of a metallized film capacitor manufacturing method of the present disclosure, illustrating film intermediate bodies produced.

FIGS. 1 and 2 are schematic views sequentially illustrating a first step of the metallized film capacitor manufacturing method of the present disclosure, and FIG. 3 is a schematic view showing a metallized film produced. FIGS.

Figure 6:
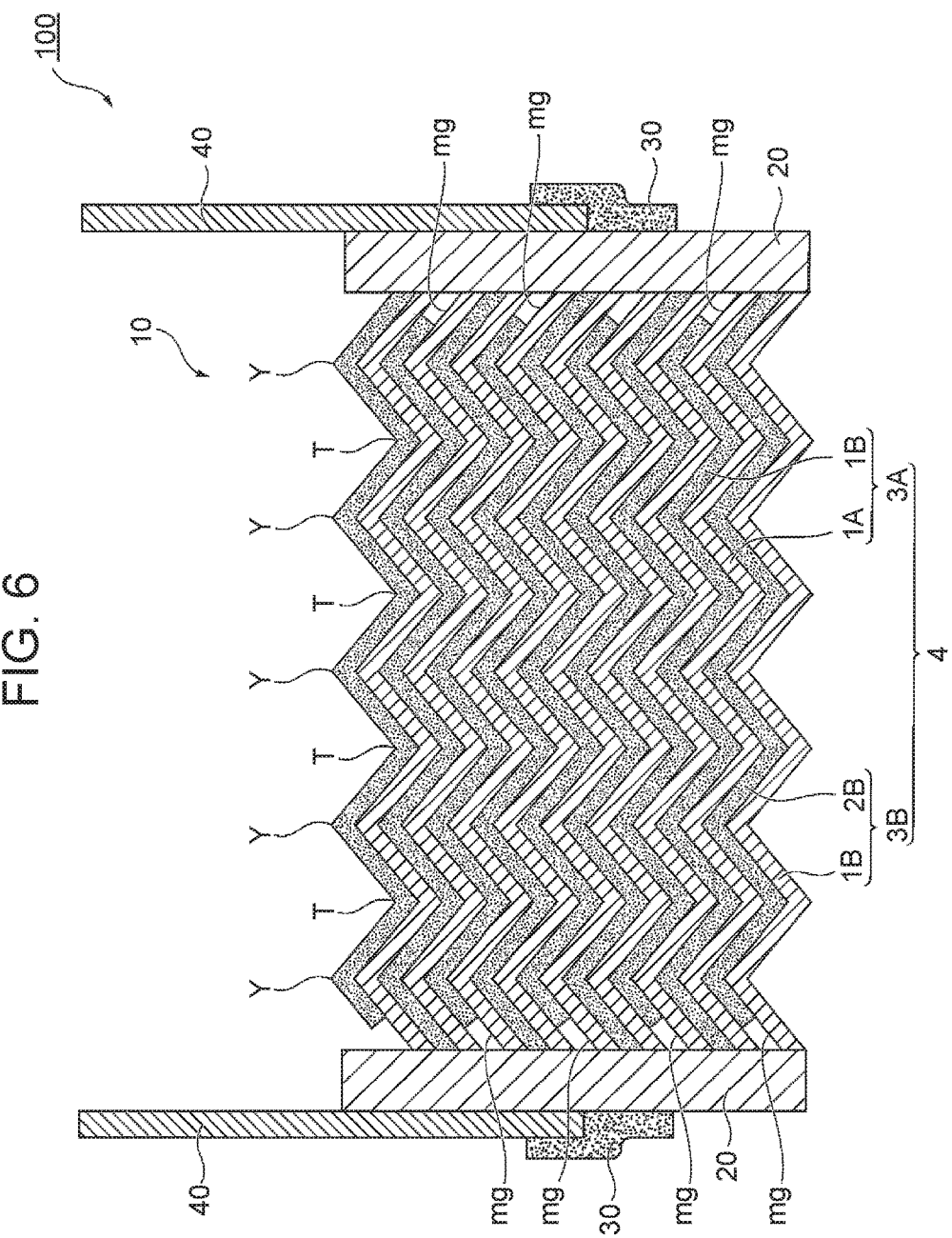
FIG. 6 is a schematic view of a third step of the metallized film capacitor manufacturing method, illustrating a metallized film capacitor manufactured.
Figure 7:
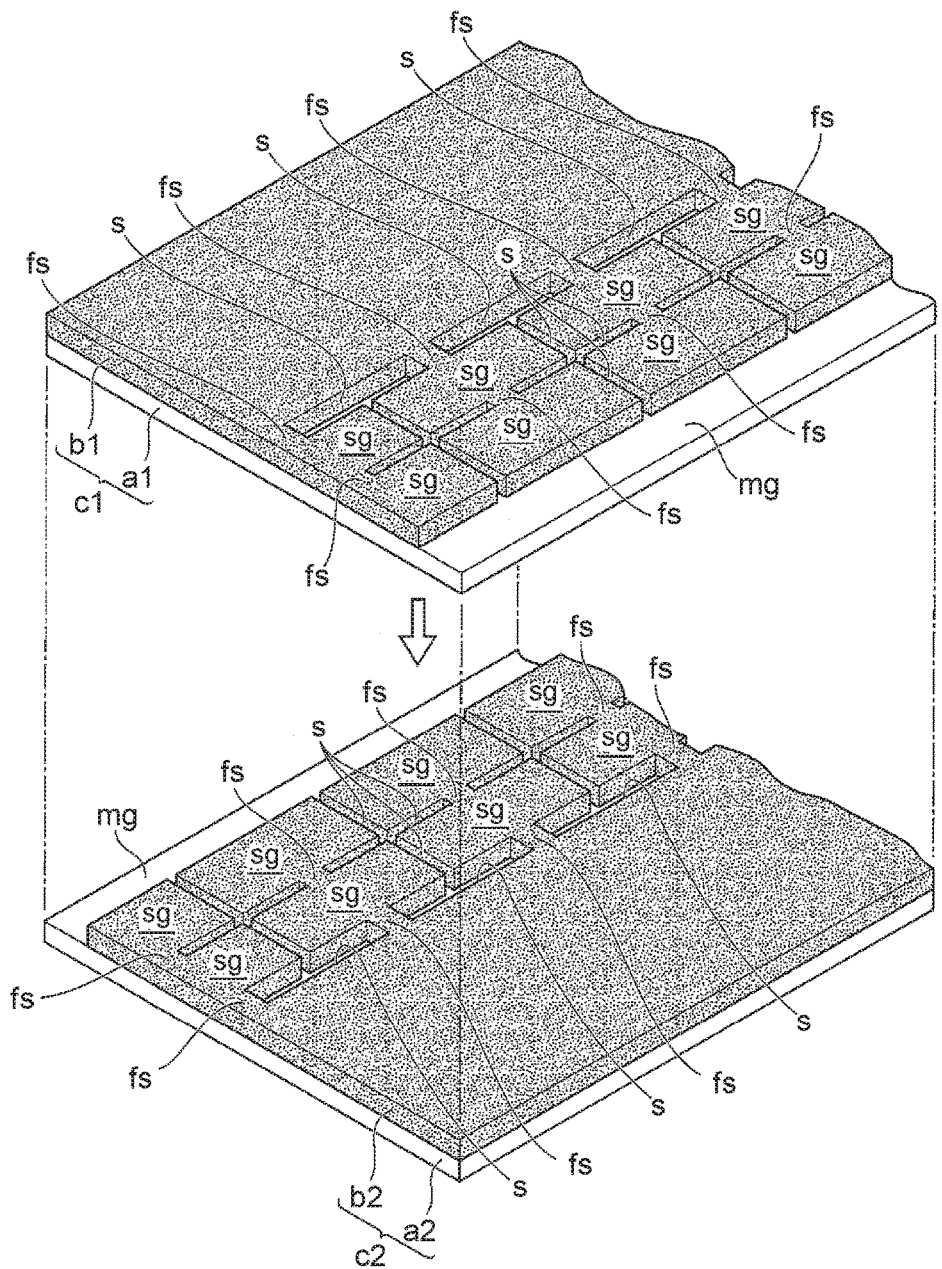
FIG. 7 is a schematic view showing a state before two metallized films of a metallized film capacitor of the related art are laminated.
Figure 8:
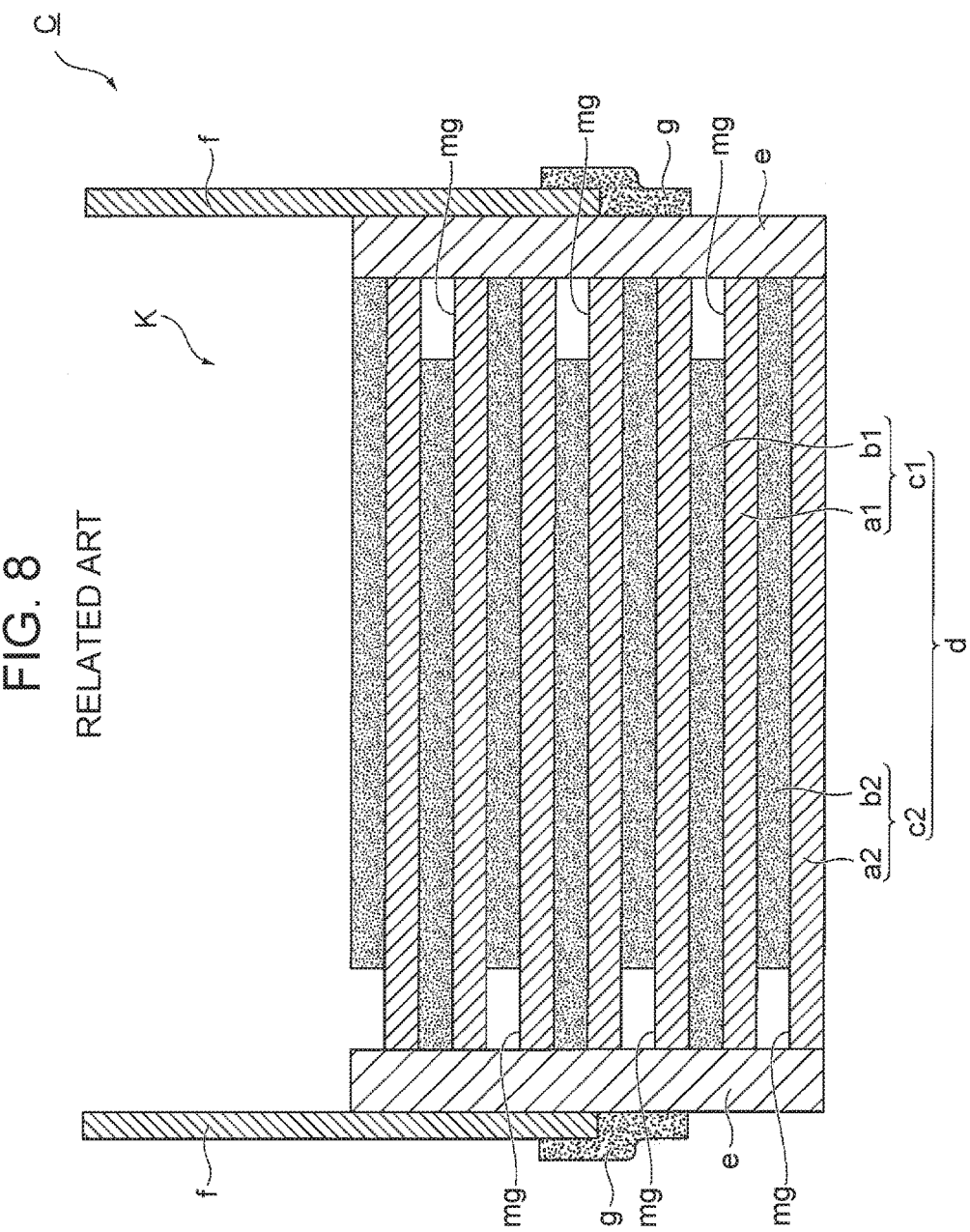
FIG. 8 is a longitudinal sectional view showing an embodiment of the metallized film capacitor of the related art.
Figure 9:
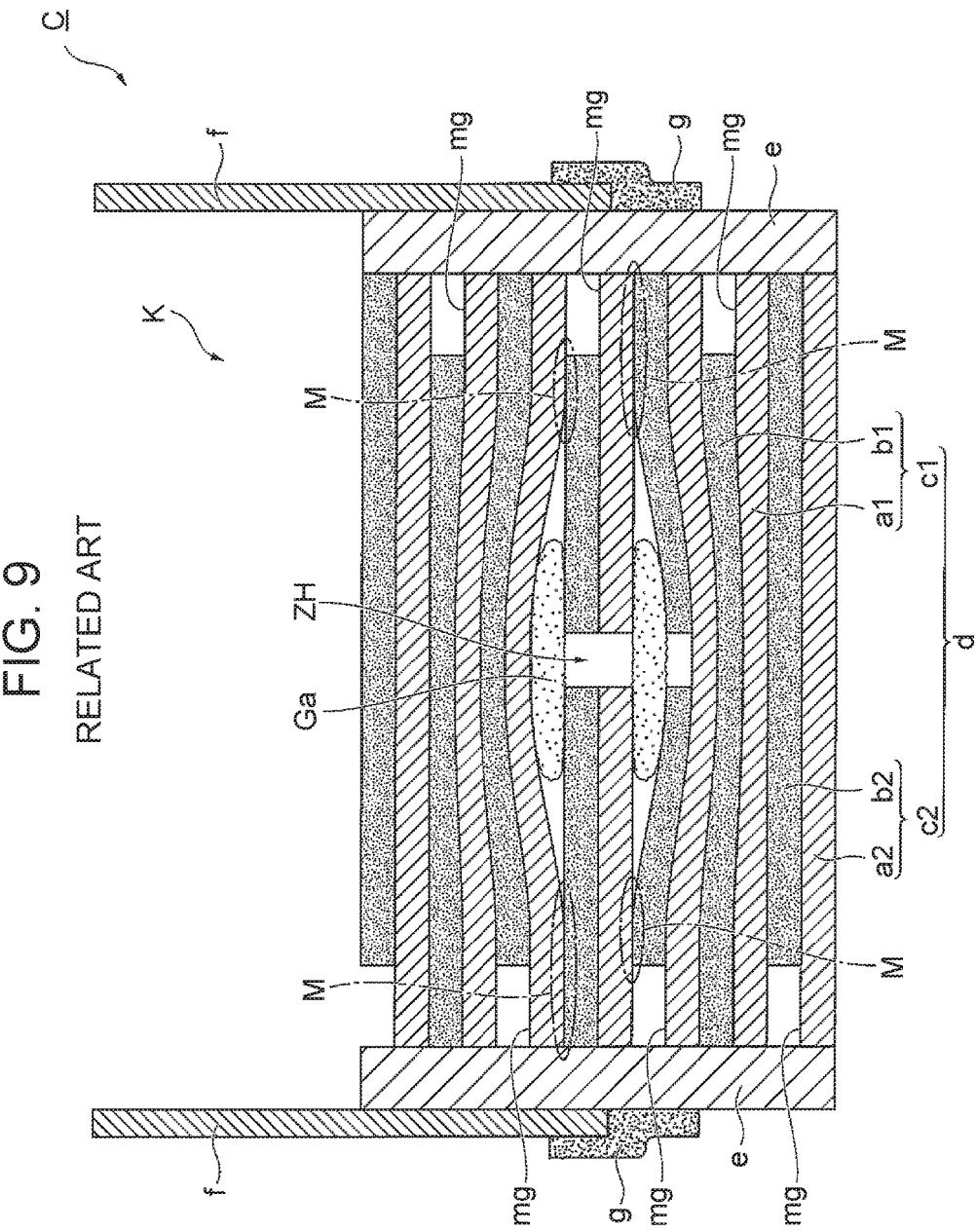
FIG. 9 is a view illustrating a state where dielectric breakdown has occurred in a part of the metallized film capacitor of the related art and a generated gas is retained.

4 and 5 are schematic views sequentially illustrating a second step of the metallized film capacitor manufacturing method. FIG. 6 is a schematic view of a third step of the metallized film capacitor manufacturing method, illustrating a metallized film capacitor manufactured.

First, as shown in FIG. 1, vapor-deposited metal films 2A', 2B' are formed respectively on surfaces of polyvinylidene fluoride (PVDF) dielectric films 1A', 1B' to produce metallized film intermediate bodies 3A', 3B'.

The metallized film intermediate body 3A' is composed of the dielectric film 1A' and the vapor-deposited metal film 2A' with vapor-deposition-free slits s and an insulation margin mg. Similarly, the other metallized film intermediate body 3B' is composed of the dielectric film 1B' and the vapor-deposited metal film 2B' with vapor-deposition-free slits s and an insulation margin mg. The insulation margins mg of the metallized film intermediate body 3A' and the metallized film intermediate body 3B' are disposed on opposite sides from each other.

In the vapor-deposited metal films 2A', 2B', a slit formation region VA including the vapor-deposition-free slits s and fuse portions fs is formed on the surfaces of the dielectric films 1A', 1B' by so-called selective vapor deposition. A non-slit formation region NA including neither vapor-deposition-free slits s nor fuse portions fs is formed on the surfaces of the dielectric films 1A', 1B' by so-called solid vapor deposition. The pattern of the vapor-deposition-free slits s is in no way limited to the example shown in the drawings, and various patterns can be adopted.

As described above, the dielectric films 1A', 1B' are made of polyvinylidene fluoride (PVDF). More specifically, the dielectric films 1A', 1B' are not limited to being made only of polyvinylidene fluoride (PVDF), but may instead be made of a polyvinylidene fluoride (PVDF) material containing a filler such as ferroelectric barium titanate (BTO: $BaTiO$).

The vapor-deposited metal films 2A', 2B' are formed by vapor deposition of aluminum, zinc, or the like on the surfaces of the dielectric films 1A', 1B'.

In the slit formation region VA of the vapor-deposited metal films 2A', 2B' of the metallized film intermediate bodies 3A', 3B', the plurality of vapor-deposition-free slits s are formed at intervals, with the narrow fuse portions fs formed between ends of the vapor-deposition-free slits s, so that the slit formation region VA is divided into a plurality of segments sg surrounded by the vapor-deposition-free slits s.

Figure 2A:
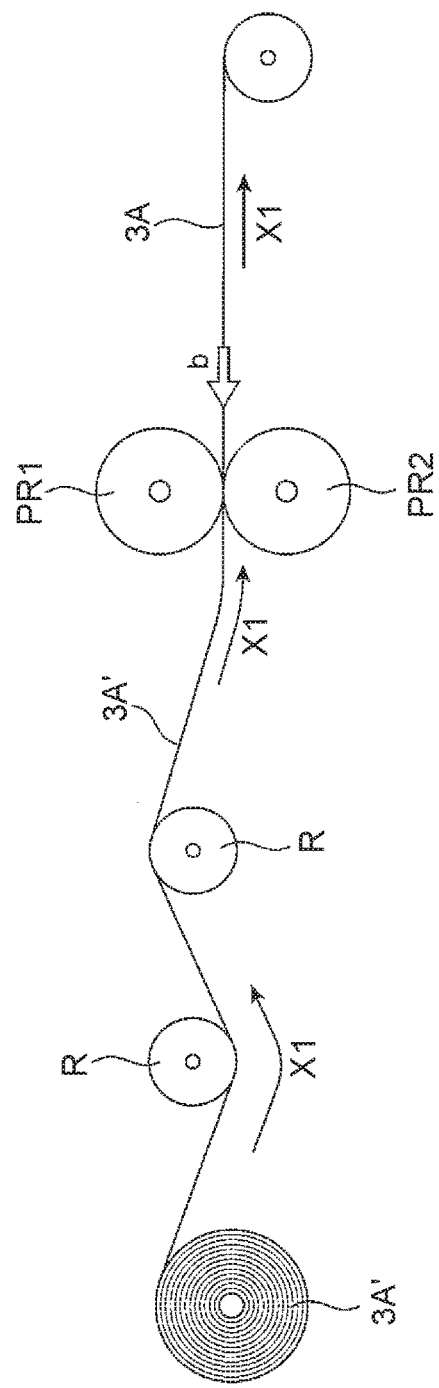
FIG. 2A is a schematic view, continuous from FIG. 1, of the first step of the metallized film capacitor manufacturing method, illustrating a method of producing a metallized film.
Figure 2B:
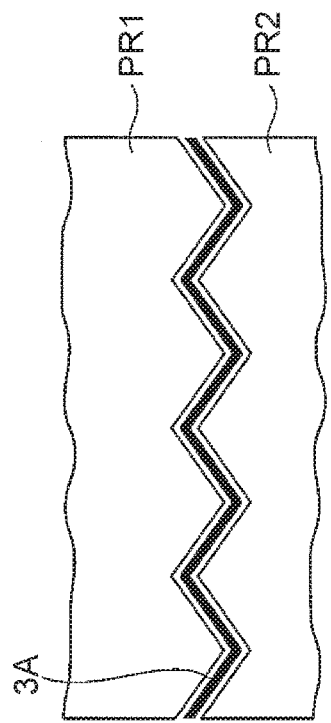
FIG. 2B is a schematic view, continuous from FIG. 1, of the first step of the metallized film capacitor manufacturing method taken along the arrow b of FIG. 2A.

Next, as shown in FIG. 2A and FIG. 2B, the metallized film intermediate body 3A' is moved (in an X1-direction) into a manufacturing device including a plurality of rotating rolls R, and upper and lower rotating rolls PR1, PR2 having zigzag recesses and projections. The metallized film intermediate body 3A' is passed between the rotating rolls PR1, PR2 to produce a metallized film 3A having a zigzag shape in a cross-section orthogonal to a winding direction L as shown in FIG. 3. In the same manner, a metallized film 3B is produced from the metallized film intermediate body 3B'.

In FIG. 3, the metallized film 3A composed of a dielectric film 1A and a vapor-deposited metal film 2A has a shape with successive sloped ridges Y and valleys T in a cross-section orthogonal to the winding direction L.

Here, a slope angle θ of the ridge Y from a horizontal line is set to 60 degrees or larger, and a width t of the ridge Y is set to 0.5 mm or larger (the end of the first step).

Figure 4:
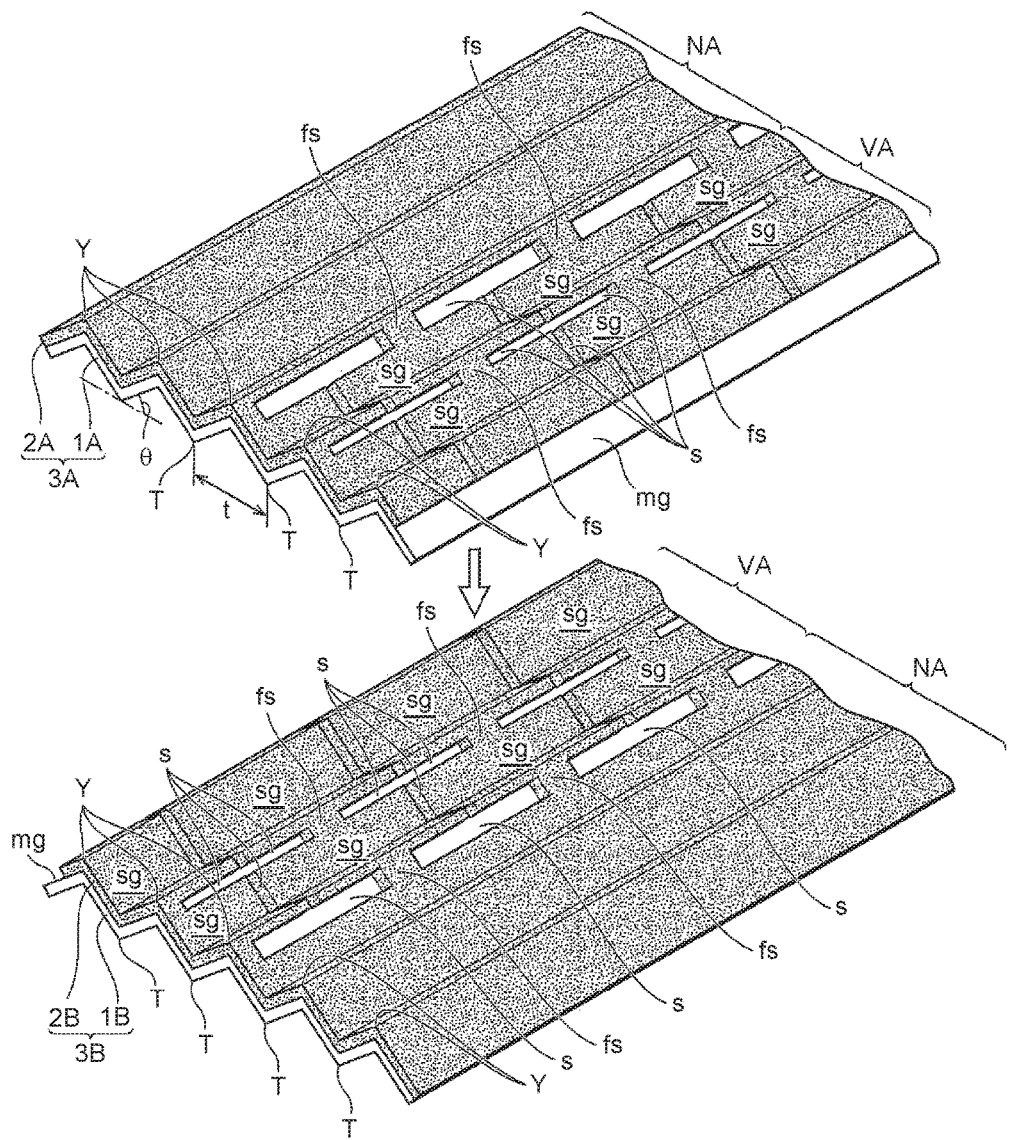
FIG. 4 is a schematic view of a second step of the metallized film capacitor manufacturing method, illustrating how two metallized films are laminated.
Figure 5:
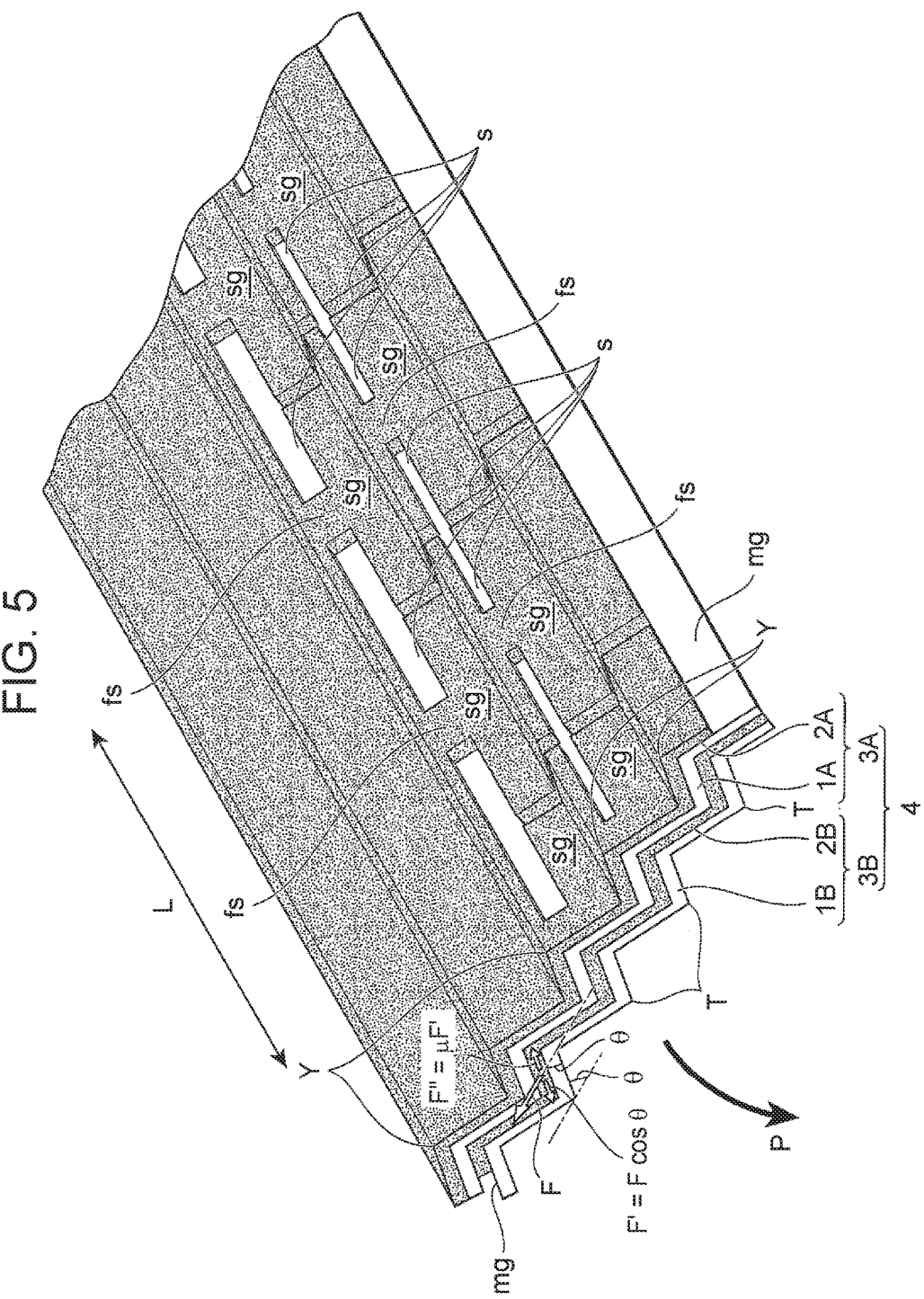
FIG. 5 is a schematic view, continuous from FIG. 4, of the second step of the metallized film capacitor manufacturing method, illustrating how the laminated metallized films are wound.

Next, as shown in FIG. 4, the two metallized films 3A, 3B are laminated with the ridges Y and the valleys T of one metallized film 3A aligned with those of the other metallized film 3B to constitute a metallized film laminate 4 as shown in FIG. 5, and then the metallized film laminate 4 is wound.

In this winding process, if the metallized film laminate 4 is wound with a winding force P, a force F trying to slip the metallized films 3A, 3B in a width direction of the metallized film laminate 4 orthogonal to the winding direction L acts on the metallized film laminate 4.

However, as the metallized films 3A, 3B have a zigzag cross-sectional shape, the laminated metallized films 3A, 3B are less likely to be misaligned with each other in the width direction.

Moreover, as the ridge Y is sloped at the slope angle θ from the horizontal line, the force F trying to slip the metallized films 3A, 3B in the width direction is reduced to cos θ times the original force F ($F'=F \cos θ$) in a horizontal direction, so that the metallized films 3A, 3B are less likely to slip.

The metallized films 3A, 3B resist the reduced force F', which tries to slip the metallized films 3A, 3B, with a frictional force of $F''=\mu F'$ (μ: a coefficient of static friction) acting therebetween.

Here, the present inventors have found that the coefficient of static friction of the metallized films 3A, 3B should be 0.8 or higher to provide the metallized films 3A, 3B with high windability and an enhanced self-healing function. The coefficient of static friction of the polyvinylidene fluoride (PVDF) dielectric films 1A, 1B is approximately 0.4. Accordingly, if the non-slipperiness of the dielectric films 1A, 1B is doubled, the non-slipperiness is substantially equivalent to a coefficient of static friction of 0.8.

If the slope angle θ of the ridge Y from the horizontal line is 60 degrees, the force F of the metallized films 3A, 3B trying to move sideward out of alignment is expressed as $\cos 60°=½$ ($F'=½ \times F$). Thus, the force F' trying to slip the metallized films 3A, 3B is halved, which is substantially the same as the coefficient of static friction of the dielectric films 1A, 1B of 0.4 being doubled.

The metallized film laminate 4 is wound to produce a metallized film columnar body 10 (the end of the second step).

Metal-sprayed parts 20 made of aluminum, zinc, or the like are formed respectively on electrode extraction surfaces at both ends of the metallized film columnar body 10, and outgoing terminals 40, such as rod- or plate-like bus bars, are connected respectively to surfaces of the formed metal-sprayed parts 20 through a solder layer 30. Thus, a metallized film capacitor 100 is formed as shown in FIG. 6 (the end of the third step).

In the metallized film capacitor 100 shown in FIG. 6, the plurality of metallized films 3A, 3B are engaged at the respective ridges Y and valleys T. Thus, when a gas pressure of a gas generated during dielectric breakdown acts on the metallized films 3A, 3B, the metallized films 3A, 3B are less likely to expand and retention of the gas is prevented, so that the self-healing function is enhanced.

The present inventors conducted an experiment to verify the windability and the self-healing function of metallized film capacitors. Table 1 below shows specifications of Examples 1 to 3 and Comparative Examples 1 to 3, and results of the experiment on the windability and the self-healing function.

TABLE 1

|  | Example 1 | Example 2 | Example 3 | Comparative Example 1 | Comparative Example 2 | Comparative Example 3 |
|---|---|---|---|---|---|---|
| Material | Composite PVDF + BTO | Composite PVDF + BTO | Composite PVDF + BTO | Polymer PP | Composite PVDF + BTO | Composite PVDF + BTO |
| Surface roughness Ra (nm) | 20 to 30 | 20 to 30 | 20 to 30 | 20 to 30 | 20 to 30 | 15 |
| Coefficient of static friction | 0.5 | 0.5 | 0.5 | 1.5 to 3.0 | 0.5 | 1 |
| Modulus of elasticity (GPa) | 2 | 2 | 2 | 2 | 2 | 2 |
| Cross-sectional shape zigzag or not | Yes | Yes | Yes | No | No | No |
| Ridge width (mm) | 1 | 2 | 1 | — | — | — |
| Ridge angle (°) | 60 | 60 | 45 | — | — | — |
| Ridge area | Entire surface | Entire surface | Entire surface | — | — | — |
| Windability | Good | Good | Good | Good | Poor | Good |
| Self-healing properties | Good | Good | Depends on thermal load | Good | Poor | Poor |
| Remarks |  |  |  | Size is large |  |  |

In Table 1, the "zigzag" cross-sectional shape means a shape with successive ridges and valleys. The "ridge angle" means a slope angle of the ridge of the metallized film capacitor from a horizontal line. The "entire surface" in the "ridge area" means that the pluralities of ridges and valleys succeed each other and that the entire cross-section is sloped relative to the horizontal line. A criterion used for determining the windability was whether the metallized films were successfully divided into elements with specified position accuracy; "Good" indicates a successful case, and "Poor" indicates an unsuccessful case. A criterion used for determining the self-healing properties was whether the metallized film capacitor recovered from dielectric breakdown by the action of the fuse of the vapor-deposited metal film when a voltage was applied to a finished product and dielectric breakdown was caused in the metallized film; "Good" indicates a case where the capacitor recovered from dielectric breakdown, "Poor" indicates a case where the capacitor did not recover from dielectric breakdown, and "Depends on thermal load" indicates a case where recovery of the capacitor from dielectric breakdown depended on a thermal load.

According to Table 1, the metallized film capacitors of Examples 1 and 2 achieved good results in terms of both the windability and the self-healing properties.

While the metallized film capacitor of Example 3 had high windability, recovery of this capacitor from dielectric breakdown depended on the thermal load. This is because the metallized films of Example 3 were slightly more likely to slip due to the angle of the ridges being smaller than that of Examples 1 and 2.

On the other hand, the metallized film capacitor of Comparative Example 1 had high windability and self-healing properties, but the size was too large to meet a requirement of downsizing the metallized film capacitor.

The metallized film capacitor of Comparative Example 2 had low windability due to the metallized films slipping excessively during the winding process. The metallized film capacitor of Comparative Example 3 had low self-healing properties due to a lack of clearance between the metallized films.

The results of this experiment demonstrate that the metallized film capacitor of the present disclosure is excellent in both windability and self-healing properties. It is also demonstrated that the angle of the ridge is desirably set to 60 degrees or larger.

While the embodiment of the present disclosure has been described in detail using the drawings, the specific configuration is not limited to that of this embodiment, and the present disclosure includes any design changes etc. made within the scope of the gist of the disclosure. For example, in regard to the "ridge area," the metallized film may have a cross-sectional shape with only one ridge and one valley succeeding each other.

What is claimed is:

1. A metallized film capacitor comprising:
   a metallized film columnar body including two metallized films that are laminated and wound, the two metallized films each including a vapor-deposited metal film with a plurality of vapor-deposition-free slits and fuse portions each interposed between the vapor-deposition-free slits, and a polyvinylidene fluoride dielectric film, the metallized film columnar body having two electrode extraction surfaces;
   metal-sprayed parts disposed respectively on the two electrode extraction surfaces; and
   outgoing terminals joined respectively to the metal-sprayed parts, wherein
   each of the two metallized films has a shape with successive sloped ridges and valleys in a cross-section orthogonal to a winding direction, and
   the two metallized films are laminated such that the ridges and valleys of one of the metallized films are aligned with the ridges and valleys of the other one of the metallized films.

2. The metallized film capacitor according to claim 1, wherein each of the ridges has such a shape that a resistance of twice a coefficient of friction of the dielectric film acts on the dielectric film.

3. The metallized film capacitor according to claim 1, wherein each of the ridges has such a shape that a resistance equivalent to a coefficient of static friction of 0.8 or higher acts on the dielectric film.

4. The metallized film capacitor according to claim 1, wherein a slope angle θ of each of the ridges from a horizontal line is 60 degrees or larger.

5. A metallized film capacitor manufacturing method comprising:
   forming, on a surface of a polyvinylidene fluoride dielectric film, a vapor-deposited metal film with a plurality of vapor-deposition-free slits and fuse portions each interposed between the vapor-deposition-free slits to produce a metallized film intermediate body, and then shaping the metallized film intermediate body so as to have successive sloped ridges and valleys in a cross-section orthogonal to a winding direction of the metallized film intermediate body to produce a metallized film;
   laminating two of the metallized film with the ridges and valleys of one of the metallized films aligned with the ridges and valleys of the other one of the metallized films, and winding the laminate to produce a metallized film columnar body; and forming metal-sprayed parts respectively on two electrode extraction surfaces of the metallized film columnar body and joining outgoing terminals respectively to the metal-sprayed parts, thus manufacturing the metallized film capacitor.

6. A metallized film laminate for a wound metallized film capacitor comprising:

two metallized films each including a vapor-deposited metal film with a plurality of vapor-deposition-free slits and fuse portions each interposed between the vapor-deposition-free slits, and a polyvinylidene fluoride dielectric film, the two metallized films are laminated and wound to constitute the metallized film laminate, each of the two metallized films has a shape with successive sloped ridges and valleys in a cross-section orthogonal to a winding direction, and the two metallized films are laminated such that the ridges and valleys of one of the metallized films are aligned with the ridges and valleys of the other one of the metallized films.

* * * * *